(12) United States Patent
Kuo

(10) Patent No.: US 10,119,871 B2
(45) Date of Patent: Nov. 6, 2018

(54) PRESSURE SENSING SYSTEM

(71) Applicant: Pegatron Corporation, Taipei (TW)

(72) Inventor: Yu-Feng Kuo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 128 days.

(21) Appl. No.: 15/272,524

(22) Filed: Sep. 22, 2016

(65) Prior Publication Data
US 2017/0176271 A1    Jun. 22, 2017

(30) Foreign Application Priority Data

Dec. 16, 2015 (TW) .............................. 104142368 A

(51) Int. Cl.
G01L 1/24 (2006.01)
G01L 5/00 (2006.01)

(52) U.S. Cl.
CPC ............ G01L 1/247 (2013.01); G01L 5/0038 (2013.01)

(58) Field of Classification Search
CPC .......... G01L 1/247; G01L 1/24; G01L 5/0038
USPC .................................................... 73/862.624
See application file for complete search history.

(56) References Cited

U.S. PATENT DOCUMENTS

| 7,149,376 | B2 * | 12/2006 | Uchida ..................... G02B 6/43 385/15 |
| 8,474,810 | B2 * | 7/2013 | Yamamoto ............ G01J 1/0422 271/10.02 |
| 8,611,716 | B2 * | 12/2013 | DeMeritt ............. G02B 6/4214 385/130 |
| 9,063,281 | B2 * | 6/2015 | Lin ....................... G02B 6/4286 |
| 2011/0128553 | A1 | 6/2011 | Nakanishi | |
| 2014/0168153 | A1 | 6/2014 | Deichmann et al. | |

FOREIGN PATENT DOCUMENTS

| CN | 102096525 A | 6/2011 | |
| CN | 105094467 A | 11/2015 | |
| JP | EP 1519388 A1 * | 3/2005 | ............. B82Y 20/00 |
| TW | I332178 | 10/2010 | |

* cited by examiner

*Primary Examiner* — Jonathan Dunlap
*Assistant Examiner* — Octavia Hollington
(74) *Attorney, Agent, or Firm* — McClure, Qualey & Rodack, LLP

(57) ABSTRACT

A pressure sensing system includes a circuit board, a case, a cover layer, a plurality of light emitters, and a photo detector. The circuit board has a top surface and a bottom surface. The case is located near the bottom surface of the circuit board. The distance between circuit board and the case decreases when the circuit board is subjected to a pressure. The cover layer covers a part of the top surface and a part of the bottom surface, wherein a part of the top surface which is not covered by the cover layer includes a plurality of first passing zone and a second passing zone, and a part of the bottom surface which is not covered by the cover layer includes a plurality of bottom passing zone. The light emitters are located on the first passing zone, respectively, and the photo detector is located on the second passing zone.

11 Claims, 5 Drawing Sheets

PRESSURE SENSING SYSTEM

CROSS-REFERENCE TO RELATED APPLICATIONS

This non-provisional application claims priority under 35 U.S.C. § 119(a) to Patent Application No(s). 104142368 filed in Taiwan, Republic of China on Dec. 16, 2015, the entire contents of which are hereby incorporated by reference.

BACKGROUND

Technology Field

The invention of this disclosure relates to a pressure sensing systems and, more particularly, to a pressure sensing systems having increased pressure sensitivity.

Description of the Related Art

An electric device is often equipped with an input interface having a pressure sensing function, as a touch pad, for sensing touch pressure (e.g., finger touch pressure). Thus, when the touch pad senses a finger touch, the electric device may execute a corresponding event based on the position or the pressure of the finger touch.

FIG. 1 is an exploded perspective view of a conventional touch pad, as is known in the prior art. As illustrated, touch pad 500 has a touching layer 510, a flexible layer 520, and a circuit layer 530. The touching layer 510 is located above both the flexible layer 520 and the circuit layer 530, and is designed for bearing a pressure. The flexible layer 520 is located between the touching layer 510 and the circuit layer 530 and separates the touching layer 510 from the circuit layer 530 to prevent shorting. The circuit layer 530 is configured to transform a finger touch pressure to an electrical signal and to transmit the electrical signal to a processor of the electric device to allow the electric device to execute the corresponding event. When the touching layer 510 is subjected to the pressure, the touching layer 510 is deflected downward and thus the pressure is transferred to the flexible layer 520. At that time, both the touching layer 510 and the flexible layer 520 become thinner at the point of contact due to the contact pressure. The circuit layer 530 may change the output resistance after sensing the variation in thickness of the touching layer 510 and the flexible layer 520. The processor can calculate the variable of the output resistance to obtain the pressure value.

However, the flexible layer has elasticity. When the touching layer 510 and the flexible layer 520 are subjected to the pressure, the elasticity of the flexible layer may offset a part of the pressure. Additionally, the recovery speed of the flexible layer after pressed may vary with the pressure and the time. Accordingly, the conventional touch pad suffers from accuracy problems.

SUMMARY

The invention of this disclosure is directed to a pressure sensing system having increased sensitivity.

According to one aspect of the invention, a pressure sensing system includes a circuit board, a case, a cover layer, a plurality of light emitters, and a photo detector. The circuit board has a top surface and a bottom surface. The case is located near the bottom surface of the circuit board; the distance between circuit board and the case decreases when the circuit board is subjected to a pressure. The cover layer covers a part of the top surface and a part of the bottom surface. A part of the top surface, which is not covered by the cover layer, includes a plurality of first passing zones and a second passing zone, and a part of the bottom surface which is not covered by the cover layer includes a plurality of bottom passing zones. The light emitters are located on the first passing zones, respectively, and the photo detector is located on the second passing zone. Light emitted by the light emitters enters into the circuit board, and part of the light passes through the second passing zone to enter into the photo detector after being reflected by the cover layer and part of the light passes through the bottom passing zones to enter into the space between the case and the circuit board.

In an embodiment of the pressure sensing system, the positions of the first passing zone may correspond to the positions of the bottom passing zones, respectively.

In an embodiment of the pressure sensing system, when the circuit board is subjected to the pressure, the distance between the circuit board and the case may be decreased and thus the intensity of the light emitted by the light emitters detected by the photo detector may be increased.

In an embodiment of the pressure sensing system, the first passing zones may be located at corners of the circuit board and the second passing zone may be located at the center of the circuit board.

In an embodiment of the pressure sensing system, the pressure sensing system may further include a plurality of flexible elements located at the circuit board to keep a flexible distance between circuit board and the case.

In an embodiment of the pressure sensing system, the pressure sensing system may further include a display device located above the circuit board and a cover plate located above the display device.

According to another aspect of the disclosure, the disclosure provides a pressure sensing system including a circuit board, a case, a plurality of light emitters, and a plurality of photo detectors. The circuit board has a bottom surface. The case is located near the bottom surface of the circuit board; the distance between circuit board and the case decreases when the circuit board is subjected to a pressure. The light emitters are located on the bottom surface and facing to the case, and the photo detectors are located on the bottom surface and facing to the case. Part of light emitted by the light emitters enters into the photo detectors after reflected by the case.

In another embodiment of the pressure sensing system, when the circuit board is subjected to the pressure, the distance between circuit board and the case may be decreased and thus, the intensity of the light emitted by the light emitters detected by the photo detectors may be increased.

In another embodiment of the pressure sensing system, the light emitters and the photo detectors may be located at corners of the circuit board.

In another embodiment of the pressure sensing system, the pressure sensing system may further include a plurality of flexible elements located at the circuit board to keep a flexible distance between circuit board and the case.

In another embodiment of the pressure sensing system, the pressure sensing system may further include a display device located above the circuit board and a cover plate located above the display device.

DETAILED DESCRIPTION

Certain advantages and innovative features of the invention will become more apparent from the following preferred embodiments.

Figure 1:
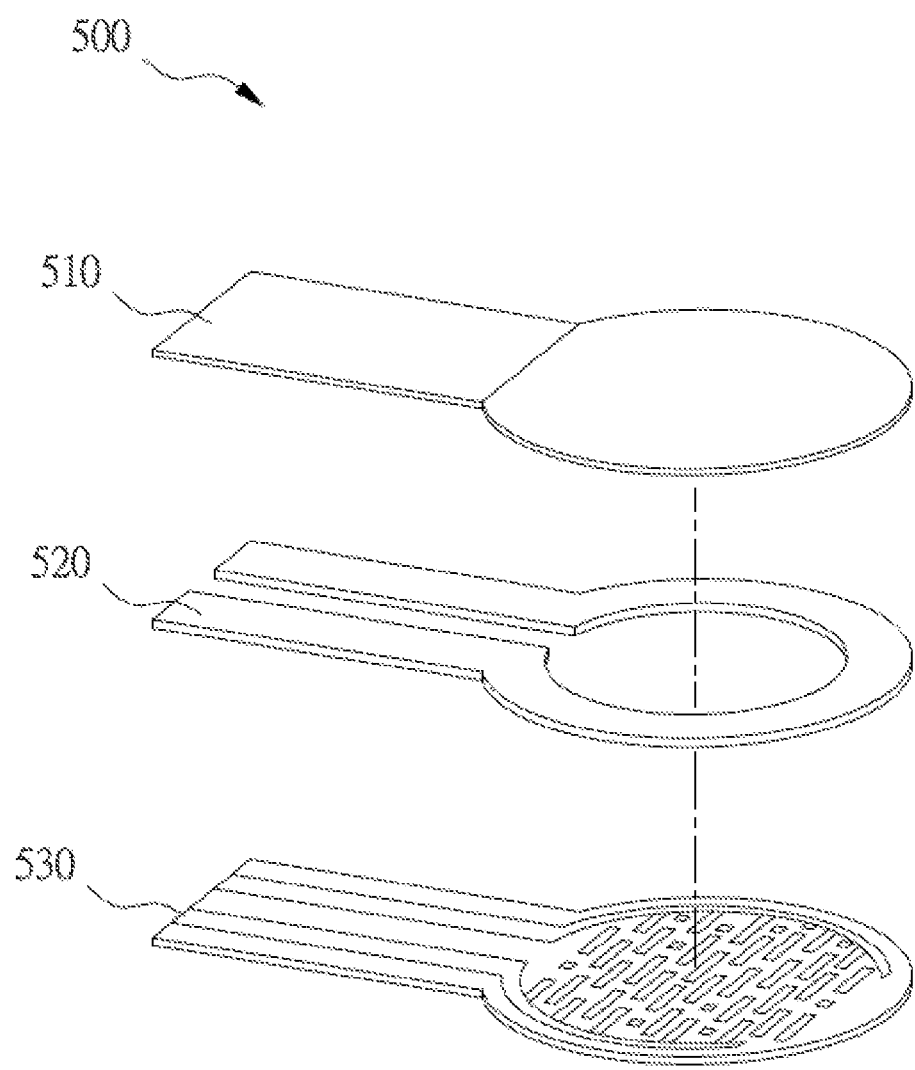
FIG. 1 is an exploded perspective view of a touch pad in the related art.
Figure 2:
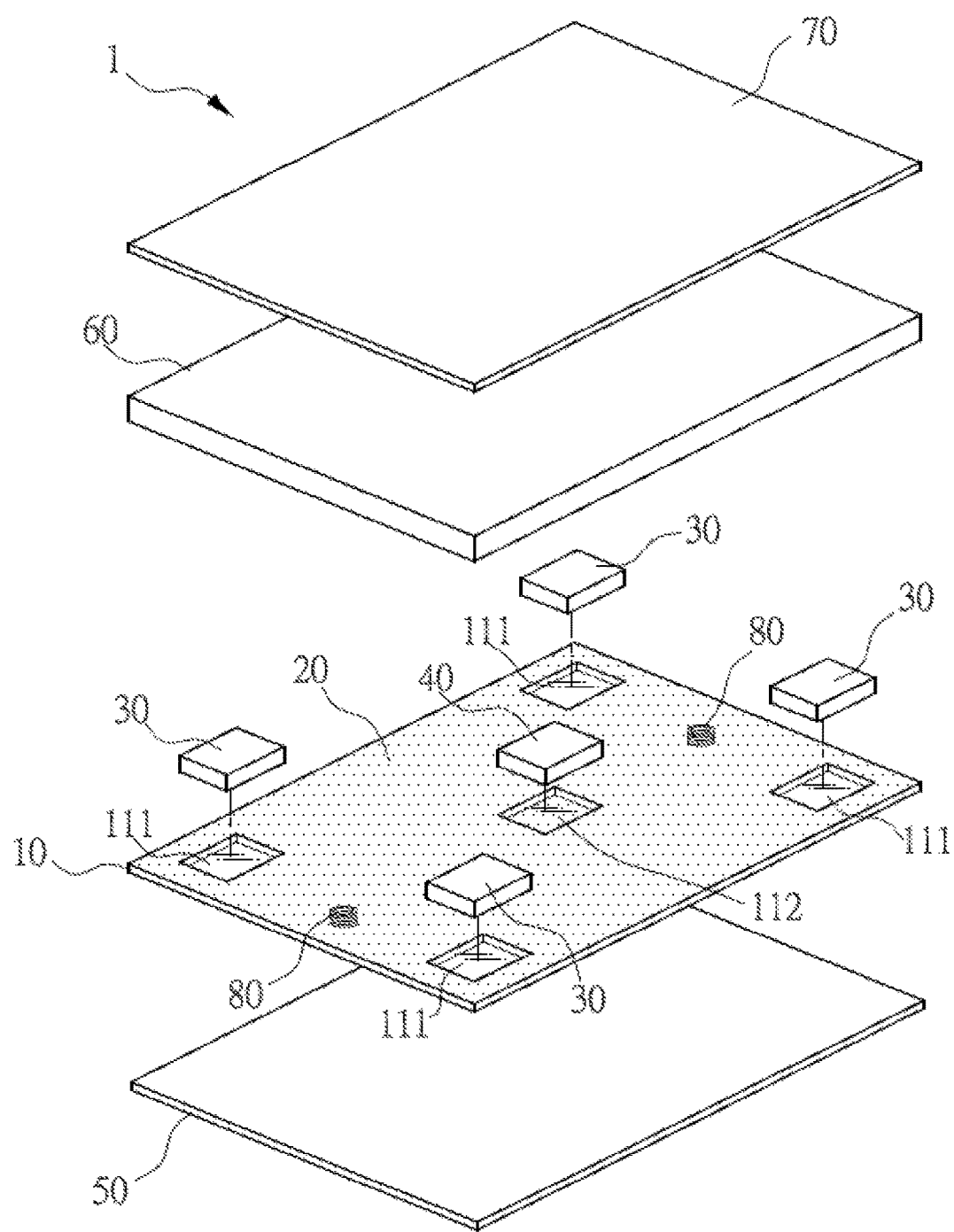
FIG. 2 is an exploded perspective view of a pressure sensing system according to a first embodiment of the invention.
Figure 3:
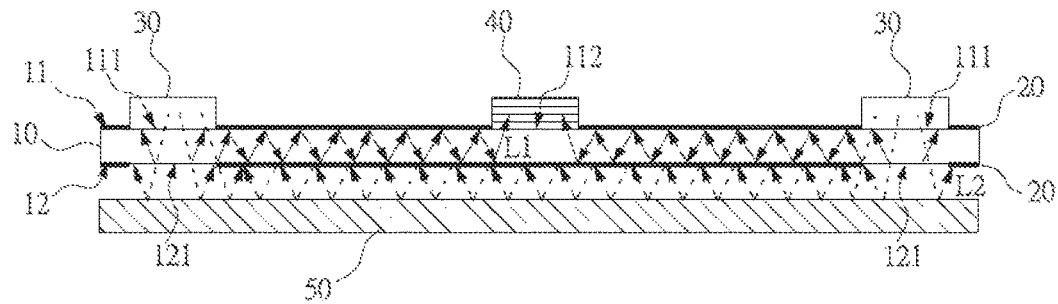
FIG. 3 is a schematic diagram showing that a photo detector detects light emitted by light emitters when a circuit board is not subjected to any pressure according to the first embodiment of the invention.
Figure 4:
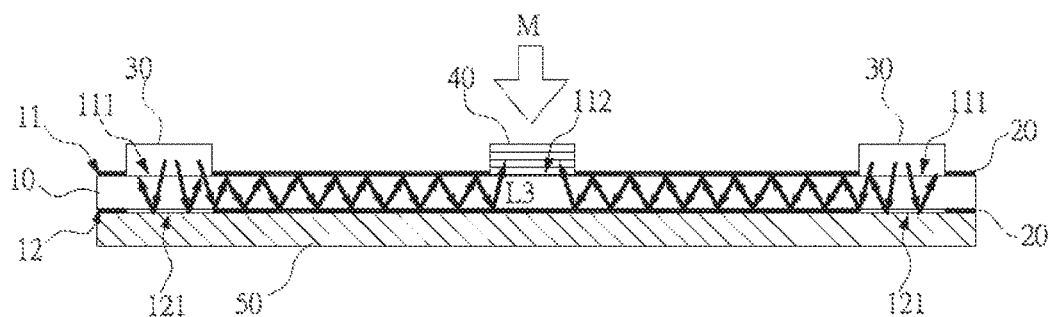
FIG. 4 is a schematic diagram showing that the photo detector detects the light emitted by the light emitters when the circuit board is subjected to a pressure according to the first embodiment of the invention.

Please refer to FIG. 2, FIG. 3, and FIG. 4. A pressure sensing system 1 is disclosed according to a first embodiment of the invention. FIG. 2 is an exploded perspective view of the pressure sensing system according to the first embodiment of the invention. FIG. 3 is a schematic diagram showing that a photo detector detects light emitted by light emitters when a circuit board is not subjected to any pressure according to the first embodiment of the invention. FIG. 4 is a schematic diagram showing that the photo detector detects the light emitted by the light emitters when the circuit board is subjected to a pressure according to the first embodiment of the invention.

In FIG. 2, the first embodiment of the pressure sensing system 1 according to the invention includes a circuit board 10, at least a cover layer 20, four light emitters 30, at least one photo detector 40, a case 50, a display device 60, a cover plate 70, and two flexible elements 80. The pressure sensing system 1 in the embodiment is used in electronic devices having a touch element and a processor such as tablets, smart phones, and automatic teller machines etc. However, the electric devices are not limited thereto.

In FIG. 2 and FIG. 3, the circuit board 10 of the first embodiment includes a top surface 11 and a bottom surface 12. The board body of the circuit board 10 is translucent and therefore light can pass through the circuit board 10. The general circuit board has a solder mask on the board body. The cover layer 20 of the circuit board 10 of the first embodiment could be formed by removing parts of the solder masks on the board body to cover a part of the top surface 11 and a part of the bottom surface 12. The top surface 11 of the other parts of the circuit board 10, which are not covered by the cover layer 20, includes a plurality of first passing zones 111 and at least one second passing zone 112.

The board body of the circuit board is general made of some fiber boards and resins which allow light passes. So that passing zones of the circuit board of embodiments could be formed by removing parts of the solder masks of the circuit board. The resins could be epoxy resins or other translucent resins.

The bottom surface 12 of the other parts, which are not covered by the cover layer 20, includes a plurality of bottom passing zones 121. The positions of the first passing zone 111 correspond to the positions of the bottom passing zone 121, respectively. In the first embodiment of the invention, the number of the first passing zones 111 is four and the first passing zones 111 are located at four corners of the top surface 11, respectively; the number of the second passing zone 112 is one and the second passing zone 112 is located at the center of the top surface 11; the number of the bottom passing zones 121 is also four and the bottom passing zones 121 are located at corners of the bottom surface 12 to correspond to the first passing zones 111. Although the number and the positions of the first passing zones 111, the second passing zone 112, and the bottom passing zones 121 have been described with reference to the first embodiments, this description is not meant to be construed in a limiting sense. In this regard, persons skilled in the art will appreciate that a different number of first and second passing zones, and/or different locations of zones may be utilized consistent with the scope and spirit of the present invention.

In the first embodiment of the invention, four light emitters 30 are located on the four first passing zones 111, respectively. The light emitters 30 may be infrared emitters used for emitting infrared light. The photo detector 40 is located on the second passing zone 112. The photo detector 40 may be an infrared detector used for detecting infrared light emitted by the light emitters 30. However, the kind of the light emitters and the photo detector could be other kinds of light emitter and photo detector for emitting and detecting different light, respectively.

In the first embodiment of the invention, the case 50 is located near the bottom surface 12 of the circuit board 10. When the circuit board 10 is subjected to a pressure, the distance between the circuit board 10 and the case 50 is decreased. The case 50 of the first embodiment is used for protecting the electric elements within the pressure sensing system 1. The display device 60 is used for displaying images and is located above the circuit board 10. The cover plate 70 may be a transparency glass plate and is located above the display device 60 to protect the electric elements within the pressure sensing system 1 and to present the images displayed by the display device 60. The user may press the cover plate 70 to allow the display device 60 and the circuit board 10 to move toward the case 50. In the first embodiment of the invention, the two flexible elements 80 are located on the top surface 11, and are located between the circuit board 10 and the display device 60. The flexible elements 80 may be springs or other appropriate flexible objects and are used to keep a certain distance between the circuit board 10 and the case 50. The flexible elements 80 may be located on the top surface or the bottom surface of the circuit board 10 as needed. The flexible elements located on the top surface provide restoring force of pulling, while the flexible elements located on the bottom surface provide restoring force of compressing. Further, the pressure exerted on the cover plate 70 by the user can be more evenly distributed on the circuit board 10 to allow the circuit board 10 to move uniformly. For example, when the user presses any corner of the cover plate 70, the pressure may be evenly distributed on the circuit board 10 via the flexible elements 80 to allow the circuit board 10 to move uniformly. Actually, the number and the positions of the flexible elements 80 may be changed according to design requirements.

In FIG. 2 and FIG. 3 of the first embodiment, when the pressure sensing system 1 is not subjected to any pressure, part of light L1 emitted by the light emitters 30 may enter into the circuit board 10 and further advance in the circuit board 10. When the light L1 touches the cover layer 20, it is reflected by the cover layer 20 thus to continue to advance in the circuit board 10. Finally, the light L1 may pass through the second passing zone 112 to enter into the photo detector 40. At this moment, the photo detector 40 can detect light intensity of the light L1 used as an initial pressure value. In addition, the other part of the light L2 emitted by the light emitters 30 may pass through the first passing zones 111 and the bottom passing zones 121 to enter into the space between the case 50 and the bottom surface 12. Since the cover layer 20 covering the bottom surface 12 reflects the light L2, the light L2 entering into the space between the case 50 and the bottom surface 12 of the circuit board 10 is difficult to be detected by the photo detector 40.

In FIG. 2 and FIG. 4 of the first embodiment, when the circuit board 10 is subjected to a pressure by pressing the cover plate 70, the circuit board 10 may move toward the case 50 along a moving direction M to decrease the distance between circuit board 10 and the case 50 thus to allow the other part of the light L2 entering into the space between the case 50 and the bottom surface 12 of the circuit board 10 to be decreased. At the same time, the light L3, which enters into the circuit board 10 and passes through he second passing zone 112 after reflected by the cover layer 20 thus to enter into the photo detector 40, is increased. If the circuit board 10 moves to touch the case 50, the distance between the circuit board 10 and the case 50 is decreased, and the light L3 passing through the bottom passing zones 121 is immediately reflected by the case 50 to enter into the circuit board 10 and then the light L3 passes through the second passing zone 112, after being reflected by the cover layer 20, thus to enter into the photo detector 40. Accordingly, if the circuit board 10 is subjected to the pressure to move toward the case 50 along the moving direction M, the intensity of the light L3 detected by the photo detector 40 may be correspondingly increased. The photo detector 40 can detect the increased intensity of the light L3 emitted by the light emitters 30 used as a pressure sensing value. The processor of the electronic device can obtain the pressure by calculating the difference between the initial pressure value and the pressure sensing value. The pressure sensing system 1 of the first embodiment is based on the optical path of light instead of the conventional flexible layer, and therefore it can precisely sense and detect the pressure by touching. Additionally, the processor of the electric device, including the pressure sensing system 1, can operate a corresponding program or show a corresponding image in the display device based on the difference between the initial pressure value and the pressure sensing value.

Figure 5:
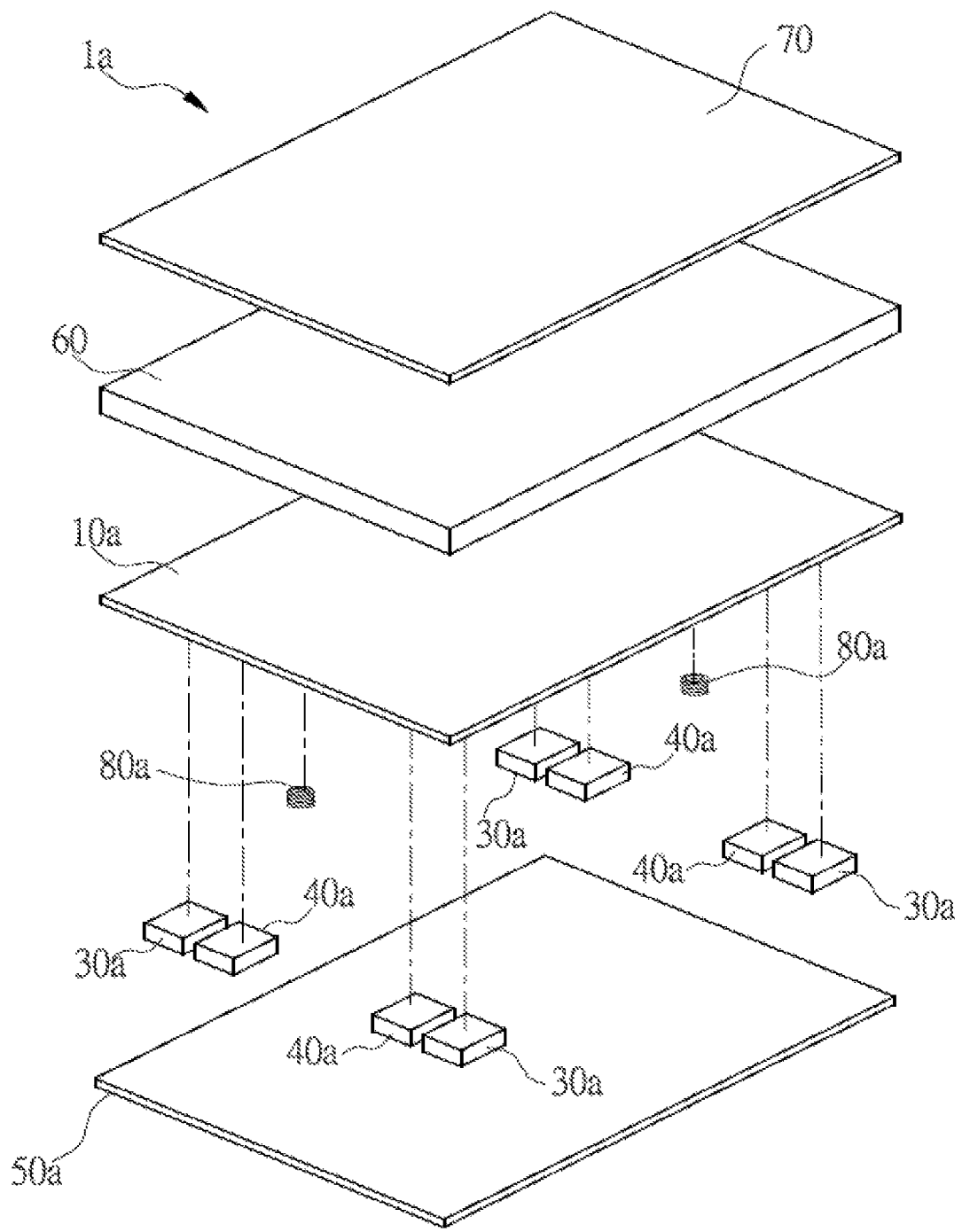
FIG. 5 is an exploded perspective view of a pressure sensing system according to a second embodiment of the invention.
Figure 6:
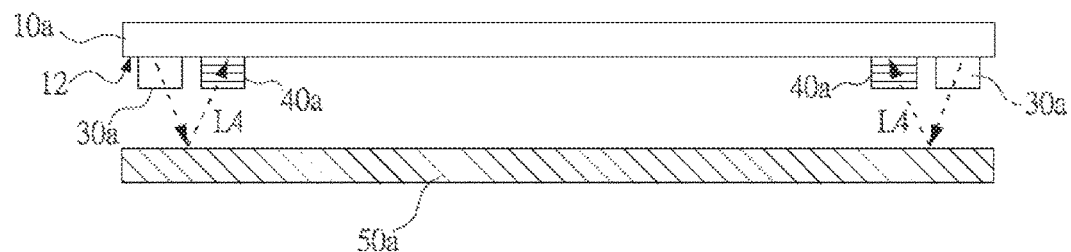
FIG. 6 is a schematic diagram showing that photo detectors detect light emitted by light emitters when a circuit board is not subjected to any pressure according to the second embodiment of the invention.
Figure 7:
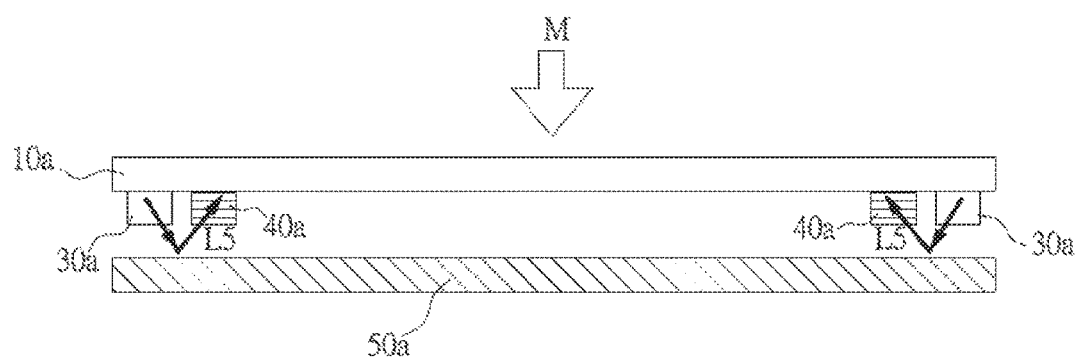
FIG. 7 is a schematic diagram showing that the photo detectors detect the light emitted by the light emitters when the circuit board is subjected to a pressure according to the second embodiment of the invention.

Please refer to FIG. 5, FIG. 6, and FIG. 7. A pressure sensing system 1a is disclosed according to a second embodiment of the invention. FIG. 5 is an exploded perspective diagram of the pressure sensing system according to a second embodiment of the invention. FIG. 6 is a schematic diagram showing that photo detectors detect light emitted by light emitters when a circuit board is not subjected to any pressure according to the second embodiment of the invention. FIG. 7 is a schematic diagram showing that the photo detectors detect the light emitted by the light emitters when the circuit board is subjected to a pressure according to the second embodiment of the invention.

The first embodiment and the second embodiment of the invention both include the cover layer on the circuit board of the pressure sensing system to reflect the light emitted by the light emitters, and the photo detector can detect different light intensities according to the differing pressure. The difference between the first embodiment and the second embodiment is illustrated in FIG. 5 to FIG. 7. In the second embodiment of the invention, the light emitters 30a are located on the bottom surface 12 of the circuit board 10a. The number of the photo detectors 40a is four and the photo detectors 40a are located on the bottom surface 12 of the circuit board 10a. The photo detectors 40a are located near the light emitters 30a and face toward the case 50a, respectively. The flexible elements 80a are located between the bottom surface 12 of the circuit board 10 and the case 50a. As will be appreciate by persons skilled in the art, the number and the positions of the light emitters 30a, the photo detectors 40a, and the flexible elements 80a may be changed according to desired design objectives.

In FIG. 6 of the second embodiment, when the circuit board 10a is not subjected to the pressure, light L4 emitted by the light emitter 30a enters into the space between the case 50a and the bottom surface 12 and enters into the photo detectors 40a after reflected by the case 50a. At this moment, the photo detectors 40a can detect light intensity of the light L4 used as an initial pressure value. When the circuit board 10a is subjected to the pressure, thus to move toward the case 50a along a moving direction M, the distance between the circuit board 10a and the case 50a is decreased. Accordingly, the light paths of light L5 from the light emitters 30a and the photo detectors 40a are correspondingly decreased. The light intensity of the light L5 detected by the photo detector 40a is increased due to reduction of light loss in the light paths. At this moment, the photo detector 40a can detect the increased intensity of the light L5 emitted by the light emitters 30a used as a pressure sensing value. The processor of the electronic device can obtain the pressure by calculating the difference between the initial pressure value of the light L4 and the pressure sensing value of the light L5.

In the pressure sensing system 1, 1a of the embodiments, the photo detector 40, 40a can detect different intensities of the light transmitted by the circuit board 10, 10a or reflected by the case 50, 50a after emitted by the light emitters 30, 30a as the variation of the pressure. Accordingly, it can precisely sense and detect the pressure by touching with much more accuracy than the conventional flexible layer.

Although the present invention has been described in considerable detail with reference to certain embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A pressure sensing system comprising:
   a circuit board having a top surface and a bottom surface;
   a case located near the bottom surface of the circuit board, wherein a distance between circuit board and the case decreases when the circuit board is subjected to a pressure;
   a cover layer covering a part of the top surface and a part of the bottom surface, wherein a part of the top surface which is not covered by the cover layer includes a plurality of first passing zones and a second passing zone, and a part of the bottom surface which is not covered by the cover layer includes a plurality of bottom passing zones;

a plurality of light emitters located on the first passing zones, respectively; and a photo detector located on the second passing zone, wherein light emitted by the light emitters enters into the circuit board, and part of the light passes through the second passing zone to enter into the photo detector after being reflected by the cover layer, and part of the light passes through the bottom passing zones to enter into the space between the case and the circuit board.

2. The pressure sensing system according to claim 1, wherein positions of the first passing zones align with the positions of bottom passing zones.

3. The pressure sensing system according to claim 2, wherein when the circuit board is subjected to the pressure, the distance between the circuit board and the case decreases and thus an intensity of the light emitted by the light emitters detected by the photo detector increases.

4. The pressure sensing system according to claim 3, wherein the first passing zones are located at corners of the circuit board and the second passing zone is located at a center of the circuit board.

5. The pressure sensing system according to claim 4, further comprising a plurality of flexible elements located at the circuit board to keep a flexible distance between the circuit board and the case.

6. The pressure sensing system according to claim 5, further comprising a display device located above the circuit board and a cover plate located above the display device.

7. A pressure sensing system comprising:
a circuit board having a bottom surface;

a case located near the bottom surface of the circuit board, wherein a distance between circuit board and the case uniformly decreases when the circuit board is subjected to a localized pressure, wherein the circuit board has a rigidity such that the circuit board remains substantially planar and does not bend in response to a localized pressure;

a plurality of light emitters located on the bottom surface and facing to the case; and a plurality of photo detectors located on the bottom surface and facing to the case, wherein part of light emitted by the light emitters enters into the photo detectors after being reflected by the case.

8. The pressure sensing system according to claim 7, wherein when the circuit board is subjected to the pressure, the distance between the circuit board and the case decreases and thus an intensity of the light emitted by the light emitters detected by the photo detectors increases.

9. The pressure sensing system according to claim 8, wherein the light emitters and the photo detectors are located at corners of the circuit board.

10. The pressure sensing system according to claim 9, further comprising a plurality of flexible elements located at the circuit board to keep a flexible distance between the circuit board and the case.

11. The pressure sensing system according to claim 10, further comprising a display device located above the circuit board and a cover plate located above the display device.

* * * * *